United States Patent
Min et al.

(10) Patent No.: US 8,883,367 B2
(45) Date of Patent: Nov. 11, 2014

(54) CATALYST FOR FUEL CELL, MEMBRANE-ELECTRODE ASSEMBLY INCLUDING SAME, AND FUEL CELL SYSTEM INCLUDING SAME

(75) Inventors: Myoung-Ki Min, Yongin-si (KR); Geun-Seok Chai, Yongin-si (KR); Hee-Tak Kim, Yongin-si (KR); Tae-Yoon Kim, Yongin-si (KR); Sang-Il Han, Yongin-si (KR); Sung-Yong Cho, Yongin-si (KR); Kah-Young Song, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 391 days.

(21) Appl. No.: 12/843,249

(22) Filed: Jul. 26, 2010

(65) Prior Publication Data

US 2011/0244362 A1    Oct. 6, 2011

(30) Foreign Application Priority Data

Apr. 5, 2010   (KR) .................. 10-2010-0030978

(51) Int. Cl.
   *H01M 4/92*    (2006.01)
   *H01M 4/90*    (2006.01)
   *H01M 8/10*    (2006.01)

(52) U.S. Cl.
   CPC .............. *H01M 4/92* (2013.01); *H01M 4/926* (2013.01); *Y02E 60/50* (2013.01); *H01M 2008/1095* (2013.01); *H01M 4/9083* (2013.01); *H01M 4/921* (2013.01)
   USPC ........................................................ 429/483

(58) Field of Classification Search
   CPC .............................. H01M 4/925; H01M 4/926
   USPC ........................................................ 429/483
   See application file for complete search history.

(56) References Cited

U.S. PATENT DOCUMENTS

| 7,132,385 B2 | 11/2006 | Pak |
| 2006/0093893 A1* | 5/2006 | Matsuo et al. .................. 429/44 |
| 2006/0099483 A1* | 5/2006 | Min et al. ........................ 429/40 |
| 2008/0182745 A1* | 7/2008 | Finkelshtain et al. ........ 502/101 |

FOREIGN PATENT DOCUMENTS

| JP | 2005-164391 | 6/2005 |
| JP | 2007-109456 | 4/2007 |
| KR | 10-0696463 B1 | 3/2007 |
| KR | 1020070045265 A | 5/2007 |

OTHER PUBLICATIONS

Office Action issued Nov. 30, 2012 in related Korean Application No. KR 10-2010-0030978.

* cited by examiner

*Primary Examiner* — Yogendra Gupta
*Assistant Examiner* — Alison Hindenlang
(74) *Attorney, Agent, or Firm* — Knobbe, Martens, Olson & Bear LLP (57) ABSTRACT

A catalyst for a fuel cell including a carrier and an active metal dispersion that is supported in the carrier is disclosed. The catalyst may have a dispersity (Dp) represented by General Formula 1 and that ranges from between about 0.01 to about 1.0.

Dispersity $(Dp) = \{X - X_{10}/(X_1 - B)\} * (B/X)^2$    [General Formula 1]

In the General Formula 1, X, $X_{10}$, $X_1$, and B are defined the same as described in the specification. A membrane-electrode assembly, and a fuel cell system having the catalyst are also disclosed.

14 Claims, 4 Drawing Sheets

CATALYST FOR FUEL CELL, MEMBRANE-ELECTRODE ASSEMBLY INCLUDING SAME, AND FUEL CELL SYSTEM INCLUDING SAME

CROSS-REFERENCE TO RELATED APPLICATIONS

This application claims priority to and the benefit of Korean Patent Application No. 10-2010-0030978 filed in the Korean Intellectual Property Office on Apr. 5, 2010, the entire contents of which are incorporated herein by reference.

BACKGROUND

1. Field of the Invention

This disclosure relates to a catalyst for a fuel cell and a membrane-electrode assembly, and a fuel cell system including the same.

2. Description of the Related Art

A fuel cell is a power generation system for producing electrical energy through an electrochemical oxidation-reduction reaction of an oxidant and hydrogen included in a hydrocarbon-based material such as methanol, ethanol, natural gas, and the like. Such a fuel cell is a clean energy source that can replace fossil fuels. It includes a stack of unit cells, and has an advantage of being able to produce various ranges of power. Since it has a four to ten times higher energy density than a small lithium battery, a fuel cell has been touted as a small portable power source.

Typical examples of a fuel cell are a polymer electrolyte membrane fuel cell ("PEMFC") and a direct oxidation fuel cell ("DOFC"). A direct oxidation fuel cell that uses methanol as a fuel is called a direct methanol fuel cell ("DMFC"). The polymer electrolyte fuel cell has an advantage of having high energy density and power, but also has the difficulties associated with requiring accessory facilities such as a fuel-reforming processor for reforming a fuel gas such as methane, methanol, and natural gas to produce hydrogen and also the difficulties associated with handling the hydrogen gas. The direct oxidation fuel cell has lower energy density than the polymer electrolyte fuel cell, but has advantages of easy handling of a liquid fuel, operating at a low temperature, and requiring no additional fuel reforming processor.

In one of the above-described fuel cells, the stack generating electricity includes several unit cells stacked in multiple layers. Each unit cell is made up of a membrane-electrode assembly ("MEA") and a separator (also referred to as a bipolar plate). The membrane-electrode assembly has an anode (referred to as a fuel electrode or an oxidation electrode) and a cathode (referred to as an air electrode or a reduction electrode) attached to each other with an electrolyte membrane therebetween. Fuel is supplied to the anode, is adsorbed on anode catalysts, and then is oxidized to produce protons and electrons. The electrons are transferred into the anode, which is a reducing electrode, via an external circuit, while the protons are transferred into the cathode through the polymer electrolyte membrane. In addition, an oxidant is supplied to the cathode. Then the oxidant, protons, and electrons react on cathode catalysts to produce electricity and water.

SUMMARY OF CERTAIN INVENTIVE ASPECTS

In one aspect, a catalyst for a fuel cell having excellent efficiency characteristics for improving performance of a fuel cell system is provided.

In another aspect, a membrane-electrode assembly for a fuel cell including a catalyst for the fuel cell is provided.

In another aspect, a fuel cell system including a catalyst for a fuel cell is provided.

In another aspect, a catalyst for a fuel cell having improved efficiency characteristics is provided. In some embodiments, the catalyst and the fuel cell are part of a fuel cell system having improved performance over known fuel cell systems.

In another aspect, a catalyst for a fuel cell includes, for example, a carrier and an active metal dispersion supported in the carrier. In some embodiments, the dispersion has a dispersity ("Dp") represented by the following General Formula 1 and ranging from about 0.01 to about 1.0:

$$Dp = \{X - X_{10}/(X_1 - B)\} \times (B/X)^2 \quad \text{[General Formula 1]}$$

In some embodiments, X indicates the specific surface area ($m^2/g$) of an active metal calculated using the average particle diameter of the active metal acquired from X-ray diffraction spectrum using a CuKα ray and the density thereof, $X_{10}$ indicates the specific surface area ($m^2/g$) of an active metal calculated using the particle diameter and density of the active metal when it had a particle diameter of 10 nm, $X_1$ indicates the specific surface area ($m^2/g$) of an active metal calculated using the particle diameter and density of the active metal when it had a particle diameter of 1 nm, and B indicates the specific surface area ($m^2/g$) of an active metal calculated from the specific surface area of a catalyst for a fuel cell acquired through a BET (Brunauer, Emmett, Teller) analysis.

In some embodiments, the catalyst includes a direct oxidation catalyst. In some embodiments, the catalyst includes a cathode catalyst. In some embodiments, the catalyst including a direct oxidation anode catalyst having a Dp ranging from about 0.1 to about 1.0. In some embodiments, the catalyst includes a polymer electrolyte-type catalyst having a Dp ranging from about 0.1 to about 1.0. In some embodiments, the catalyst includes a cathode catalyst. In some embodiments, the catalyst includes a polymer electrolyte-type anode catalyst having a Dp ranging from about 0.2 to about 1.0. In some embodiments, the carrier is selected from the group including, for example, a carbon-based material, an inorganic material particulate, and a combination thereof. In some embodiments, the carrier includes a specific surface area ranging from about 50 to about 3000 $m^2/g$ acquired through a BET analysis. In some embodiments, the active metal includes a platinum-based metal. In some embodiments, the active metal is selected from the group including, for example, platinum, ruthenium, osmium, a platinum-ruthenium alloy, a platinum-osmium alloy, a platinum-palladium alloy, and a platinum-M alloy, and a combination thereof, and wherein M is selected from the group including, for example, Ga, Ti, V, Cr, Mn, Fe, Co, Ni, Cu, Zn, Sn, Mo, W, Rh, and Ru. In some embodiments, the active metal includes an average particle diameter ranging from about 1 to about 10 nm. In some embodiments, the active metal includes an amount ranging from about 5 to about 95 wt % based on 100 wt % of the entire catalyst.

In another aspect, a membrane-electrode assembly for a fuel cell includes, for example, a cathode and an anode facing each other and a polymer electrolyte layer disposed between the cathode and the anode. In some embodiments, the cathode includes a cathode substrate and a cathode catalyst layer, the anode includes an anode substrate and an anode catalyst layer, and either the cathode catalyst layer or the anode catalyst layer includes the catalyst according to the present invention.

In another aspect, a fuel cell system includes, for example, an oxidizing agent supplier, a fuel supplier and an electrical generator. In some embodiments, the electrical generator includes a membrane-electrode assembly and a separator. In some embodiments, the membrane-electrode assembly includes a cathode and an anode facing each other and a polymer electrolyte layer disposed between the cathode and the anode. In some embodiments, the cathode includes a cathode substrate and a cathode catalyst layer, the anode includes an anode substrate and an anode catalyst layer, and either the cathode catalyst layer or anode catalyst layer includes the catalyst according to the present invention.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments may have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it may be directly on the other element or be indirectly on the other element with one or more intervening elements interposed therebetween. Also, when an element is referred to as being "connected to" another element, it may be directly connected to the other element or be indirectly connected to the other element with one or more intervening elements interposed therebetween. Hereinafter, like reference numerals refer to like elements. Certain embodiments will be described in more detail with reference to the accompanying drawings, so that a person having ordinary skill in the art may readily make and use aspects of the present disclosure.

In general, a common catalyst for a fuel cell has a structure in which active metal nanoparticles are dispersed on the internal surface of a carrier such as carbon. This dispersity plays an important role of improving catalyst activity. In other words, the dispersity helps determine performance of a fuel cell catalyst that includes an active metal supported in a carrier. However, more research is required to determine what degree of dispersity is needed to maximize efficiency of a fuel cell. The dispersity tends to influence fuel cell efficiency together with other factors, including, for example, the amount of active metal, the particle size of the active metal, contact between the active metal and a carrier or an electrolyte layer, and the like. Thus, some aspects of the present disclosure are directed to dispersity of a catalyst for a fuel cell that improves efficiency of the fuel cell.

According to one embodiment, a catalyst for a fuel cell is provided that includes a carrier and an active metal dispersion supported in the carrier, represented by General Formula 1, wherein the dispersity (Dp) ranges from about 0.01 to about 1.0.

$$\text{Dispersity (Dp)} = \{X - X_{10}/(X_1 - B)\} * (B/X)^2 \quad \text{[General Formula 1]}$$

In the General Formula 1, X represents a specific surface area (X, m$^2$/g) of an active metal calculated from the average particle diameter of the active metal and its density acquired from an X-ray diffraction spectrum ("XRD") using a CuKα ray. When an active metal has a particle diameter of 10 nm, $X_{10}$ is the specific surface area ($X_{10}$, m$^2$/g) of the active metal calculated from its particle diameter and density. When an active metal has a particle diameter of 1 nm, $X_1$ is the specific surface area ($X_1$, m$^2$/g) of the active metal calculated from its particle diameter and density. B represents the specific surface area (B, m$^2$/g) of an active metal calculated from the specific surface area of a catalyst for a fuel cell acquired in a BET (Brunauer, Emmett, Teller) specific surface area analysis method.

The "specific surface area (X) calculated from the particle diameter and density of an active metal" represents a specific surface area calculated by the following General Formula 2-1. Herein, density of the active metal represents density at 25° C. (for example, platinum has density of 21.45 g/cm$^3$). In addition, the $X_{10}$ and $X_1$ indicate a specific surface area when an active metal respectively has a particle diameter of about 10 nm and about 1 nm in the following General Formula 2-1.

$$\text{Specific surface area } (X, \text{m}^2/\text{g}) \text{ of an active metal} = 6 / (\text{average particle diameter of an active metal } X \text{ density of an active metal}) \quad \text{[General Formula 2-1]}$$

In addition, the particle diameter of an active metal is measured by XRD unless there is no particular definition. The XRD is measured using a CuKα ray. Further, a BET specific surface area analysis method is used to measure specific surface area, total pore volume, and pore distribution of powder by absorbing nitrogen on the surface of the powder and measuring the absorbed amount of the nitrogen gas. The specific surface area (B) of a catalyst for a fuel cell may be acquired by measuring the specific surface area of a carrier in a BET specific surface area analysis method before and after an active metal is supported in the carrier and calculating a difference from the two measurements, that is to say, the specific surface area of an active metal calculated from the specific surface area of a catalyst acquired according to General Formula 2-2.

$$\text{Specific surface area } (B, \text{m}^2/\text{g}) \text{ of an active metal} = Bo \times (1L1) - B1 \quad \text{[General Formula 2-2]}$$

In General Formula 2-2 Bo is a specific surface area of a catalyst carrier (measured in a BET method, m$^2$/g); L1 is a supported amount of an active metal particle (wt %/100); and B1 is a specific surface area of a catalyst including an active metal supported by a carrier (measure in a BET method, $m^2/g$).

In addition, a catalyst for a fuel cell may have Dp that is regulated depending on the particular type of fuel cell. Accordingly, a catalyst for a polymer electrolyte-type fuel cell may preferably have Dp ranging from about 0.1 to about 1.0. Further, a catalyst for a direct oxidation fuel cell may preferably have Dp ranging from about 0.01 to about 1.0. Thus, when a catalyst has Dp within a particular selected range, the catalyst may have improved dispersity and thus high catalyst activity. In addition, a catalyst for a fuel cell according to one embodiment may have Dp that may be regulated depending on the type of electrode as well as the type of fuel cell. Accordingly, when the catalyst for a fuel cell is used as a cathode catalyst for a polymer electrolyte-type fuel cell, it would preferably have Dp ranging from about 0.1 to about 1.0. When used as a cathode catalyst for a direct oxidation fuel cell, it would preferably have Dp ranging from about 0.01 to about 1.0. In addition, when the catalyst for a fuel cell is used as an anode catalyst for a polymer electrolyte-type fuel cell, it may preferably have Dp ranging from about 0.2 to about 1.0. When used as an anode catalyst for a direct oxidation fuel cell, it may preferably have Dp ranging from about 0.1 to about 1.0.

In some embodiments, the carrier is selected from the group including, for example, a carbon-based material, an inorganic material particulate, and a combination thereof. In particular, the carbon-based material may include graphite, denka black, Ketjenblack®, acetylene black, carbon nanotubes, carbon nanofiber, carbon nanowire, carbon nanoballs, activated carbon, or the like, and the inorganic material particulate may include alumina, silica, zirconia, titania, and the like.

A carrier may include, for example, Ketjenblack® having a large surface area or carbon nanotubes having good conductivity, acquiring high dispersity and high performance. A process of supporting an active metal in a carrier is well-known i. In addition, the carrier may have an effect of improving dispersity and support of an active metal having a specific surface area ranging from about 50 to about 3000 $m^2/g$ calculated using BET analysis.

The active metal may be selected from the group including, for example, platinum-based metals, and in particular, platinum, ruthenium, osmium, a platinum-ruthenium alloy, a platinum-osmium alloy, a platinum-palladium alloy, a platinum-M alloy (M is at least one element selected from the group consisting of Ga, Ti, V, Cr, Mn, Fe, Co, Ni, Cu, Zn, Sn, Mo, W, Rh, and Ru), and a combination thereof. Likewise, an anode and a cathode may include the same material as a catalyst for a fuel cell. However, an anode catalyst may include, for example, a platinum-ruthenium alloy as an active metal in a direct oxidation fuel cell to prevent catalyst poisoning due to CO produced during the anode reaction. In particular, it may be at least one selected from the group including, for example, Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

Herein, when the active metal has an average particle diameter ranging from about 1 nm to about 10 nm, and in particular from about 1.8 nm to about 8 nm, it may have a surface area useful in embodiments of the present disclosure and/or improved catalytic activity. When a catalyst is used in a polymer electrolyte-type fuel cell, an active metal may have an average particle diameter ranging from about 1.8 nm to about 5 nm regardless of type of electrode. In addition, when a catalyst is used in a direct oxidation fuel cell, an active metal may have an average particle diameter regulated depending on type of electrode. For example, when used as an anode catalyst, the catalyst may have an appropriate average particle diameter ranging from about 1.8 nm to about 5 nm. When used as a cathode catalyst, however, the average particle diameter may range from between about 2 nm to about 8 nm.

In some embodiments, the catalyst for a fuel cell is prepared by dispersion-supporting an active metal in a carrier. The amount of the active metal supported in a carrier may range from about 5 to about 95 wt % based on 100 wt % of the entire catalyst. The amount of active metal supported in the carrier may be selected to maximize dispersion effect.

In addition, the amount of active metal supported in a carrier may be regulated depending on type of fuel cell. For example, a catalyst for a polymer electrolyte-type fuel cell may include an active metal in an amount of between about 50 wt % and about 5 wt %, based on 100 wt % of the entire catalyst. When used for a direct oxidation fuel cell, an active metal may be included in an amount of between about 60 wt % and about 95 wt %, based on 100 wt % of the entire catalyst.

According to another embodiment, a membrane-electrode assembly for a fuel cell may include, for example, a cathode and an anode facing each other and a polymer electrolyte layer between the cathode and anode. The cathode may include a cathode substrate and a cathode catalyst layer. The anode may include an anode substrate and an anode catalyst layer. At least one of the cathode and anode catalyst layers includes a catalyst. The catalyst may include, for example, a carrier and an active metal dispersed and supported in the carrier. The catalyst is represented by General Formula 1 and has Dp ranging from about 0.1 to about 1.0.

The catalyst may be formed in a layer may further include a binder resin both to improve adherence of the catalyst layer and to transport protons. The binder resin may include a polymer resin having proton conductivity. The binder resin may include any polymer resin having a positive ion exchange group selected from the group including, for example, a sulfonic acid group, a carboxylic acid group, a phosphoric acid group, a phosphonic acid group, and a derivative thereof at the side chain. Examples of the binder resin may include, for example, at least one proton conductive polymer selected from the group consisting of a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer, and preferably, at least a proton conductive polymer selected from the group including, for example, poly(perfluorosulfonic acid), poly (perfluorocarboxylic acid), a copolymer of tetrafluoroethylene including sulfonic acid and fluorovinylether, sulfide polyetherketone, an aryl ketone, poly(2,2'-m-phenylene)-5,5'-bibenzimidazole, or poly(2,5-benzimidazole).

The proton conductive polymer may include, for example, Na, K, Li, Cs, or tetrabutylammonium substituted for H in a positive ion exchange group at the side chain. When Na is substituted for H in the ion exchange group at the side chain, NaOH is used to prepare a catalyst composition. When tetrabutylammonium is substituted, tetrabutylammonium hydroxide may be used. K, Li, or Cs may be substituted using an appropriate compound. This substitution method is well known in a related field and may not be illustrated in detail. In addition, the proton conductive polymer including substituted Na, K, Li, Cs, or tetrabutylammonium may be resulfonized during the sulfuric acid treatment of a catalyst layer, and may be converted into a proton type.

The binder resin may be used alone or a mixture and may be used with a non-conductive compound in order to selectively improve adherence to a polymer electrolyte layer. The amount of binder resin may be regulated depending upon the particular usage. Examples of the non-conductive compound may be at least one selected from the group including, for example, polytetrafluoroethylene (PTFE), a tetrafluoroethylene-hexafluoropropylene copolymer (FEP), a tetrafluoroethylene-perfluoro alkylvinylether copolymer (PFA), ethylene/tetrafluoroethylene (ETFE), an ethylenechlorotrifluoroethylene copolymer (ECTFE), a polyvinylidenefluoride, copolymer (PVdF-HFP) of polyvinylidenefluoride-hexafluoropropylene, dodecylbenzenesulfonic acid, and sorbitol.

The electrode substrate may be configured to support an electrode and/or to diffuse fuel and oxidizing agent into a catalyst layer and/or to prevent the fuel and the oxidizing agent from contacting the catalyst layer. The electrode substrate may include a conductive substrate, for example, carbon paper, carbon cloth, carbon felt, or metal cloth (a porous film fiber made of metal or a metal film disposed on the surface of polymer fiber), but is not limited thereto. In addition, the electrode substrate may be made water-repellent by treatment with a fluorine-based resin to prevent deterioration of reactant diffusion efficiency due to water during operation of the fuel cell. Examples of the fluorine-based resin may include, for example, polytetrafluoroethylene, polyvinylidene fluoride, polyhexafluoropropylene, polyperfluoroalkylvinyl ether, polyperfluorosulfonylfluoridealkoxyvinyl ether, fluorinated ethylene propylene, polychlorotrifluoroethylene, or a copolymer thereof.

In addition, the electrode substrate may further include a microporous layer to improve reactant diffusion effects. This microporous layer may include, for example, a conductive powder having a small particle diameter. Types of conductive powder may include, for example, carbon powder, carbon black, acetylene black, activated carbon, carbon fiber, fullerene, carbon nanotubes, carbon nanowire, carbon nanohorns, or carbon nanorings.

The microporous layer may be prepared by coating a composition including the conductive powder, a binder resin, and a solvent on the electrode substrate. The binder resin may include, for example, polytetrafluoroethylene, polyvinylidenefluoride, polyhexafluoropropylene, polyperfluoroan alkylvinylether, polyperfluorosulfonylfluoride, alkoxyvinyl ether, polyvinyl alcohol, cellulose acetate, or a copolymer thereof. The solvent may include, for example, an alcohol such as ethanol, isopropyl alcohol, n-propyl alcohol, butanol, and the like, water, dimethyl acetamide, dimethylsulfoxide, N-methylpyrrolidone, tetrahydrofuran, and the like. The coating may include, for example, screen printing, spray coating, or a doctor blade method depending on viscosity of a composition, but is not limited thereto.

Another embodiment provides a fuel cell system including at least one electrical generator, a fuel supplier, and an oxidizing agent supplier. The electrical generator may include, for example, a membrane-electrode assembly and a separator. The membrane-electrode assembly may include a cathode and an anode facing each other, and a polymer electrolyte layer between the cathode and the anode. The cathode may include a cathode substrate and a cathode catalyst layer, and the anode may include an anode and an anode catalyst layer. At least one of the cathode and anode catalyst layers may include a catalyst for a fuel cell.

When the fuel cell system is a polymer electrolyte-type fuel cell system using hydrogen and modified hydrogen, the catalyst for a fuel cell may have a dispersity (Dp) ranging from about 0.1 to about 1.0. When the fuel cell system is a direct oxidation fuel cell using an alcohol such as methanol and the like, the catalyst for a fuel cell may preferably have Dp ranging from about 0.01 to about 1.0.

The electrical generator is configured to generate electricity through oxidation of a fuel and reduction of an oxidizing agent. The fuel supplier is configured to supply the electrical generator with a fuel, while the oxidizing agent supplier is configured to supply the electrical generator with an oxidizing agent such as oxygen or air. The fuel may include, for example, liquid or gaseous hydrogen or a hydrocarbon fuel. The hydrocarbon fuel, for example, may include methanol, ethanol, propanol, butanol, or natural gas.

Figure 1:
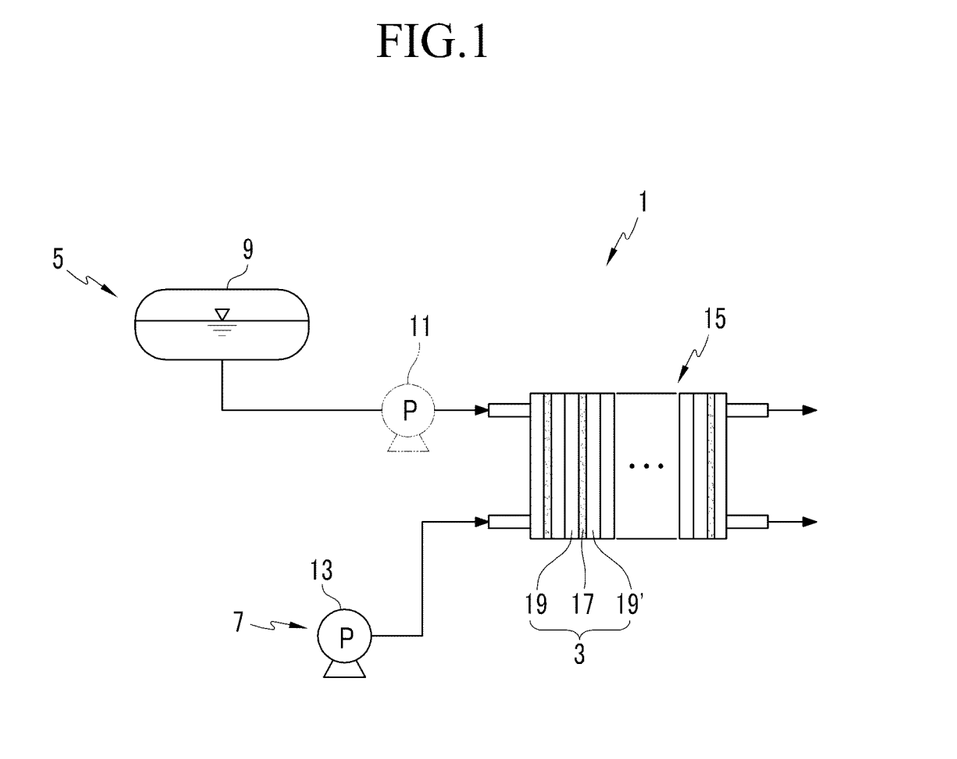
FIG. 1 depicts a structure of a fuel cell system.

FIG. 1 shows the schematic structure of a fuel cell system according to one embodiment, which will be described in detail with reference to this accompanying drawing as follows. FIG. 1 shows a fuel cell system supplying a fuel and an oxidizing agent to an electrical generating element using a pump, but the fuel cell system of FIG. 1 is not limited to such structures. The fuel cell system alternately includes a structure wherein a fuel and an oxidant are provided in a diffusion manner.

A fuel system 1 includes at least one electricity generating element 3 configured to generate electrical energy by oxidation of a fuel and reduction of an oxidizing agent, a fuel supplier 5 configured to supply the fuel, and an oxidant supplier 7 configured to supply an oxidant to the electricity generating element 3. In addition, the fuel supplier 5 is equipped with a tank 9 configured to store fuel, and a fuel pump 11, which is connected therewith. The fuel pump 11 is configured to supply fuel stored in the tank 9 with a predetermined pumping power. The oxidant supplier 7, which is configured to supply the electricity generating element 3 with an oxidant, is equipped with at least one oxidant pump 13 for supplying an oxidant with a predetermined pumping power.

The stack 15 includes a stack of at least one electricity generating element 3. The electricity generating element 3 includes a membrane-electrode assembly 17, which is configured to oxidize hydrogen or a fuel and reduce an oxidant, and separators 19 and 19' that are respectively positioned at opposite sides of the membrane-electrode assembly and that supply hydrogen or a fuel, and an oxidant, respectively.

The following examples illustrate the disclosure in more detail. However, it is understood that the disclosure is not limited by these examples. A person having ordinary skill in the art informed by the present disclosure will understand parts of the disclosure that are not explicitly described in detail.

Preparation of Catalyst for a Fuel Cell

Example 1

Preparation of a Platinum Catalyst

A precursor solution was prepared by dissolving 2.5 g of a chloroplatinic acid compound ($H_2PtCl_6 \cdot xH_2O$ including about 38 to 40 wt % of Pt, Aldrich Co. St. Lou, USA) in 14 ml of distilled water in a reactor.

Next, 14 ml of the precursor solution was added to 1 g of a Ketjenblack® (Mitsubishi Chemical, Japan) carrier and they were mixed through a common incipient wetness method.

Figure 2:
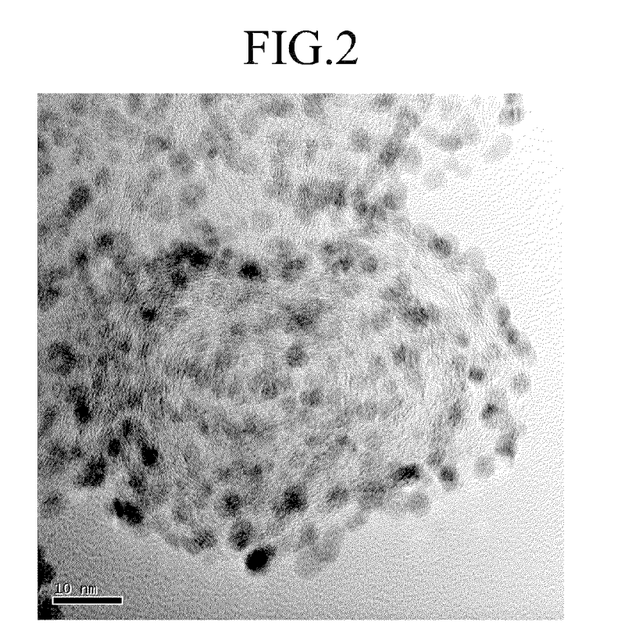
FIG. 2 is an image of a catalyst for a fuel cell according to Example 1, which is taken with a scanning electron microscope.

The mixture was dried. Then, the dried product was fired at 200° C. under atmosphere including 10 volume % of hydrogen and 90 volume % of nitrogen, preparing a catalyst for a fuel cell in which platinum is supported in a Ketjenblack® carrier. Herein, the catalyst for a fuel cell was examined using a transmission electron microscope ("TEM"). The result is provided in FIG. 2.

The catalyst for a fuel cell included 48 wt % of platinum supported by 52 wt % of a carrier based on 100 wt % of the entire amount of a catalyst.

The platinum had an average particle diameter of about 2.8 nm when it was analyzed with an X-ray diffractometer using a CuKα ray (XRD, PW1710, PHILIPS Co., Netherlands). Since platinum has density of 21.45 g/cm³ at 25° C., its density and average particle diameter were used to calculate the specific surface area of the catalyst calculated using General Formula 2-1. As a result, the catalyst had a specific surface area (X) of 99.9 m²/g.

In addition, when platinum has a particle diameter of 10 nm, a catalyst had a specific surface area ($X_{10}$) of 28.0 m²/g calculated according to General Formula 2-1 using the particle diameter and density of the platinum. When platinum has a particle diameter of 1 nm, a catalyst had a specific surface area ($X_1$) of 279.7 m²/g calculated according to General Formula 2-1 using the particle diameter and density of the platinum.

Figure 5:
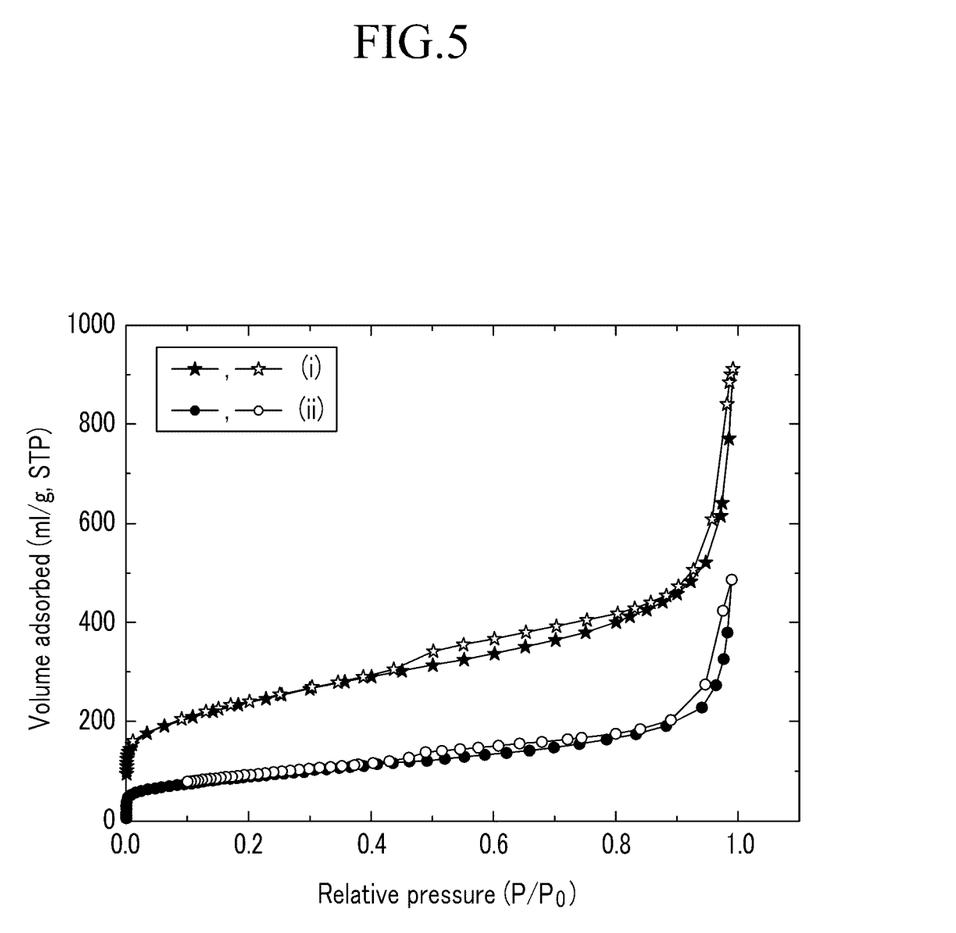
FIG. 5 is a graph showing BET analysis results of a catalyst for a fuel cell according to Examples 1, 3, and 4.

On the other hand, an active metal including the catalyst for a fuel cell was measured regarding specific surface area (B) by experimenting with nitrogen isothermal adsorption and desorption of Ketjenblack® (i) as a carrier and a catalyst (ii) supported in this carrier. FIG. 5 shows the nitrogen adsorption-desorption isothermal graph (★ and ● are adsorption, ☆ and ○ are desorption). The Ketjenblack® used as a carrier had a surface area (Bo) of 876 m²/g, which was calculated using the result and a Brunauer-Emmett-Teller (BET) method. The carrier had a surface area (B1) of 361 m²/g after 48 wt % of an active metal was supported therein. Accordingly, the catalyst for a fuel cell had a specific surface area (B) of 94.5 m²/g calculated according to General Formula 2-2.

As a result, the catalyst for a fuel cell according to Example 1 was identified to have dispersity (Dp) of 0.347 calculated according to General Formula 1.

The following Table 1 shows X, $X_{10}$, $X_1$, B, and Dp of the catalyst according to Example 1.

Example 2

Preparation of a Platinum Catalyst

A precursor solution was prepared by dissolving 2.5 g of a chloroplatinic acid compound ($H_2PtCl_6 \cdot xH_2O$ including Pt in an amount of about 38 to 40 wt %, Aldrich Co.) in 14 ml of distilled water in a reactor.

14 ml of the precursor solution was added to 1 g of a Ketjenblack® carrier and they were mixed through an incipient wetness method.

The mixture was dried. The dried product was fired at 400° C. under atmosphere including 10 volume % of hydrogen and 90 volume % of nitrogen, preparing a catalyst for a fuel cell including platinum supported in a Ketjenblack® carrier.

The catalyst for a fuel cell included 48 wt % of platinum supported by 52 wt % of a carrier based on 100 wt % of the entire amount of the catalyst.

The platinum had an average particle diameter of about 4.8 nm when analyzed using XRD using CuKα ray, (model number PW1710, PHILIPS Co., Netherlands). Since platinum has density of 21.45 g/cm³ at 25° C., the density and average particle diameter of the platinum were used to calculate a specific surface area (X) of the catalyst according to General Formula 2-1. As a result, the catalyst had a specific surface area (X) of 58.3 m²/g.

In addition, when platinum has a particle diameter of 10 nm, the particle diameter and density of the platinum were used to calculate the specific surface area ($X_{10}$) of the catalyst calculated according to General Formula 2-1. As a result, the platinum had a specific surface area ($X_{10}$) of 28.0 m²/g. When platinum has a particle diameter of 1 nm, the density and particle diameter of the platinum were used to calculate the specific surface area ($X_1$) of a catalyst. As a result, the catalyst had a specific surface area ($X_1$) of 279.7 m²/g.

On the other hand, an active metal included in the catalyst for a fuel cell was calculated regarding specific surface area (B) in a BET method. As a result, Ketjenblack® as a carrier had a specific surface area (Bo) of 876 m²/g, while the carrier had a specific surface area (B1) of 403 m²/g after 48 wt % of the active metal was supported therein. Accordingly, the active metal for a fuel cell had a specific surface area (B) of 52.5 m²/g calculated according to General Formula 2-2.

The following Table 1 shows X, $X_{10}$, $X_1$, B, and Dp of the catalyst according to Example 2.

Comparative Example 1

Preparation of a Platinum Catalyst

A precursor solution was prepared by dissolving 2.5 g of a chloroplatinic acid compound ($H_2PtCl_6 \cdot xH_2O$ including Pt in an amount of about 38 to 40 wt %, Aldrich Co.) in 14 ml of distilled water in a reactor.

14 ml of the precursor solution was added to 1 g of a Ketjenblack® carrier and they were mixed through an incipient wetness method.

The mixture was dried. The dried product was fired at 800° C. under atmosphere including 10 volume % of hydrogen and 90 volume % of nitrogen, preparing a catalyst for a fuel cell including platinum supported by a Ketjenblack® carrier.

The catalyst for a fuel cell included 48 wt % of platinum and 52 wt % of a carrier based on 100 wt % of the entire amount of a catalyst.

The platinum had an average particle diameter of about 8.5 nm when measured using X-ray diffraction spectrum (X-ray Diffractometer (XRD), PW1710, PHILIPS Co.) using a CuKα ray. Since platinum has density of 21.45 g/cm³ at 25° C., the density and average particle diameter of the platinum were used to calculate the specific surface area (X) of the catalyst. As a result, the catalyst had a specific surface area (X) of 32.9 m²/g calculated according to General Formula 2-1.

In addition, when platinum has a particle diameter of 10 nm, the particle diameter and density of the platinum were used to calculate its specific surface area ($X_{10}$) according to General Formula 2-1. As a result, the platinum had a specific surface area ($X_{10}$) of 28.0 m²/g. When platinum has a particle diameter of 1 nm, the particle diameter and density of the platinum were used to calculate its specific surface area ($X_{10}$) according to General Formula 2-1. As a result, the platinum had a specific surface area ($X_1$) of 279.7 m²/g.

On the other hand, when an active metal included in the catalyst for a fuel cell was measured regarding specific surface area (B) in a BET method, Ketjenblack® as a carrier had a specific surface area (Bo) of 876 m²/g and a specific surface area of 439 m²/g after 48 wt % of a active metal is supported therein. Accordingly, the catalyst for a fuel cell had a specific surface area (B) of 16.5 m²/g calculated according to General Formula 2-2.

The following Table 1 shows X, $X_{10}$, $X_1$, B, and Dp of the catalyst according to Comparative Example 1.

TABLE 1

| | X (m²/g) | X10 (m²/g) | X1 (m²/g) | B (m²/g) | Dp |
|---|---|---|---|---|---|
| Example 1 | 99.9 | 28 | 280 | 94.5 | 0.347 |
| Example 2 | 58.3 | 28 | 280 | 52.5 | 0.108 |
| Comparative Example 1 | 32.9 | 28 | 280 | 16.5 | 0.005 |

Example 3

Preparation of a Platinum-Cobalt Alloy Catalyst

A precursor solution was prepared by dissolving 2.5 g of a chloroplatinic acid compound ($H_2PtCl_6 \cdot xH_2O$ including Pt in an amount of about 38 to 40 wt %, Aldrich Co.) in 14 ml of distilled water in a reactor.

14 ml of the precursor solution was added to 1 g of a Ketjenblack® carrier and they were mixed through in an incipient wetness method.

The mixture was dried. The dried product was fired at 200° C. under atmosphere including 10 volume % of hydrogen and 90 volume % of nitrogen, acquiring a product including platinum supported in a Ketjenblack® carrier.

Next, $(CoNO_3)_2 \cdot 6H_2O$, a cobalt precursor, was added to 10 ml of distilled water to prepare a cobalt solution. The product was dipped in the cobalt solution in an incipient-wetness method. Herein, platinum and cobalt were mixed in a mole ratio of 3:1.

The mixture was dried. The dried product was fired at 500° C. under atmosphere of 10 volume % of hydrogen and 90 volume % of nitrogen, preparing a platinum-cobalt alloy catalyst for a fuel cell.

Figure 3:
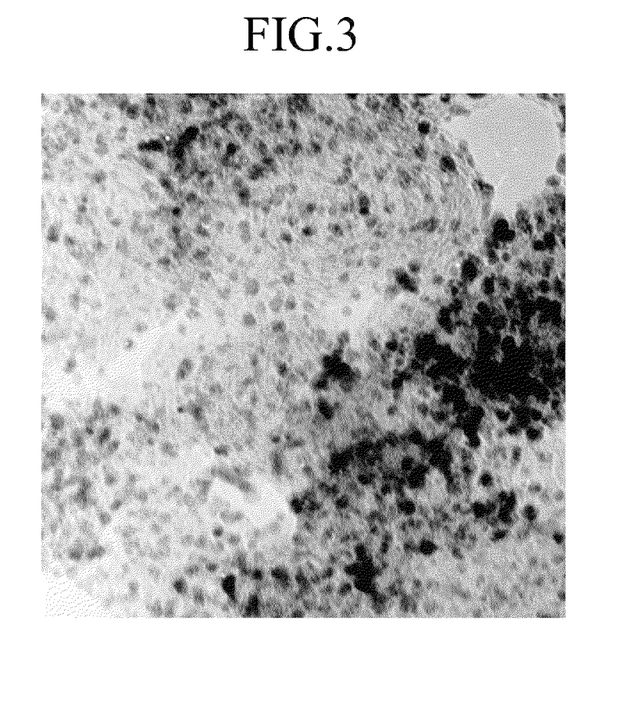
FIG. 3 is an image of a catalyst for a fuel cell according to Example 3, which is taken with a scanning electron microscope.

The catalyst for a fuel cell was examined with a transmission electron microscope ("TEM"). The result is provided in FIG. 3.

The catalyst for a fuel cell included 51.2 wt % of a platinum-cobalt alloy supported in a carrier and 49.8 wt % of the carrier based on 100 wt % of the entire amount of the catalyst. In addition, the platinum-cobalt alloy had an average particle diameter of about 4.5 nm, when examined through X-ray diffraction spectrum (XRD) using a CuKα ray. Since platinum has density of 21.45 g/cm³ at 25° C., the density of the platinum and the average particle diameter of a platinum-cobalt alloy were used to calculate the specific surface area (X) of the catalyst according to General Formula 2-1. As a result, the catalyst had a specific surface area (X) of 62.2 m²/g. As for the platinum-cobalt alloy, since only platinum participates in a catalyst-activating reaction, the specific surface area of the catalyst was calculated from the density of the platinum.

On the other hand, the catalyst for a fuel cell was measured regarding another specific surface area (B) in a BET method. Ketjenblack® as a carrier had a surface area (Bo) of 876 m²/g and another surface area (B1) of 362 m²/g after 51.2 wt % of an active metal was supported therein. The active metal had a specific surface area (B) of 65.5 m²/g calculated according to General Formula 2-2.

Accordingly, the catalyst for a fuel cell according to Example 3 had dispersity (Dp) of 0.178 calculated according to General Formula 1.

Example 4

Preparation of a Platinum-Ruthenium Alloy Catalyst 2.5 g of a chloroplatinic acid compound ($H_2PtCl_6 \cdot xH_2O$ including Pt in an amount about 38 to 40 wt %, Aldrich Co.) and 5.18 g of ruthenium chloride compound (including ruthenium in an amount about 10 wt %) were dissolved in 150 ml of distilled water in a reactor.

Next, a Ketjenblack® carrier, which is a common carbon carrier, was added to the solution and mixed together, preparing a slurry.

$NH_4OH$ was added to the slurry in order to obtain a pH of 12.0 and then while the pH was maintained, 150 ml of ethylene glycol (EG) was added thereto and refluxed together.

The refluxed product was dried. The dried product was fired at 200° C. under atmosphere including 10 volume % of hydrogen and 90 volume % of nitrogen, preparing a platinum-ruthenium (PtRu/C) alloy catalyst supported in a carrier.

Figure 4:
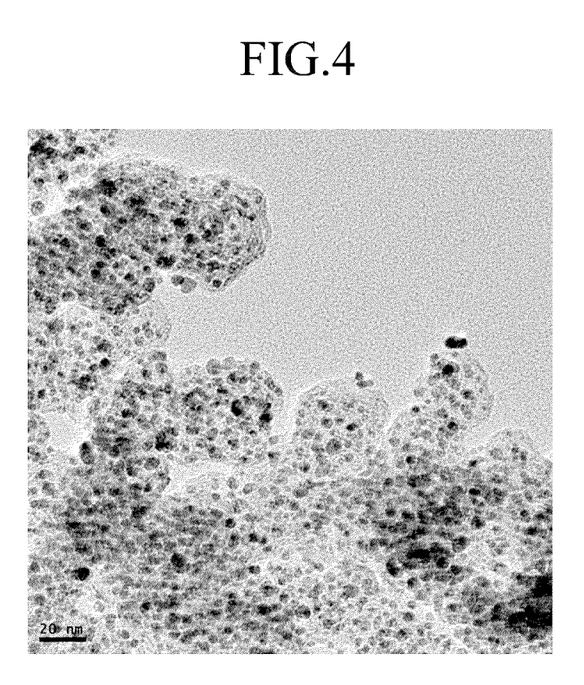
FIG. 4 is an image of a catalyst for a fuel cell according to Example 4, which is taken with a scanning electron microscope.

The catalyst for a fuel cell was examined using a transmission electron microscope (TEM). The result is provided in FIG. 4.

The catalyst for a fuel cell included a platinum-ruthenium alloy in an amount of 53.2 wt % and a carrier in an amount of 47.8 wt % based on 100 wt % of a catalyst. In addition, the platinum-ruthenium alloy had an average particle diameter of 3.7 nm when checked through X-ray diffraction spectrum (XRD) analysis using a CuKα ray. Since the platinum-ruthenium alloy has density of 17.51 g/cm³ at 25° C., the average particle diameter and the density of the platinum-ruthenium alloy were used to calculate the specific surface area (X) of a catalyst according to General Formula 2-1. The catalyst had a specific surface area (X) of 92.6 m²/g.

On the other hand, the catalyst for a fuel cell was analyzed regarding another specific surface area (B) in a BET method. The Ketjenblack® carrier had a specific surface area (Bo) of 876 m²/g, and then another specific surface area (B1) of 334 m²/g, after 53.2 wt % of an active metal was supported therein. Accordingly, the catalyst for a fuel cell had a specific surface area (B) of 76.0 m²/g calculated according to General Formula 2-2.

In addition, the catalyst for a fuel cell according to Example 4 was identified to have dispersity (Dp) of 0.214 calculated according to General Formula 1.

Example 5

Fabrication of a Fuel Cell

The catalyst according to Example 1 was added in a weight ratio of 90:10 to a mixed solvent prepared by mixing water and isopropyl alcohol in a volume ratio of 50:50. Then, 37 parts by weight of a Nafion™ solution (Nafion 1100 EW, Dupont Co.) were added to 100 parts by weight of the mixture.

The mixture was applied with ultrasonic waves for uniform agitation, preparing a cathode catalyst composition.

On the other hand, an anode catalyst composition was prepared according to the same method as performed to prepare the cathode catalyst composition except for using the catalyst (PtRu/C: supported amount of Pt—Ru: 53.2 wt %) according to Example 4.

The cathode and anode catalyst compositions were respectively coated in a doctor blade method on a transfer film to respectively form cathode and anode catalyst layers. Next, a Nafion™ polymer electrolyte layer (Nafion 115, Dupont Co. Wilmington, Del.) was positioned to contact the cathode and anode catalyst layers on the transfer film. The cathode and anode catalyst layers were transmitted at 150° C. under 20 atm into the polymer electrolyte layer and dispose cathode and anode catalyst layers thereon.

Then, carbon paper substrates treated with tetrafluoroethylene ("TEFLON") (anode/cathode: SGL 35BC/35BC SGL made by Carbon Group, SGL Group, The Carbon Company, SGL Technologies GmbH, Fuel Cell Components, Werner-von-Siemens-Str. Meitingen, Germany) were respectively disposed as an electrode substrate (gas diffusion layer (GDL)) on the cathode and anode catalyst layers not contacting the surface of the polymer electrolyte, fabricating a membrane-electrode assembly.

In the membrane-electrode assembly, the cathode catalyst layer was loaded with a cathode catalyst in an amount of 0.25 mg/cm$^2$, while the anode catalyst layer was loaded with an anode catalyst in an amount of 0.35 mg/cm$^2$.

Then, the membrane-electrode assembly was inserted between gaskets, and then between two separators equipped with a gas flow channel and a cooler channel having a particular shape and compressed between copper end plates, fabricating a single cell.

Example 6

A single cell was fabricated according to the same method as Example 5 except for using the catalyst of Example 5 instead of the one of Example 1.

Comparative Example 2

A single cell was fabricated according to the same method as Example 5 except for using the catalyst of Comparative Example 1 instead of the one of Example 1.

The single cells according to Examples 5 and 6 and Comparative Example 2 were measured regarding open circuit voltage (OCV) and output density at 60° C. The results are provided in the following Table 2.

Herein, H$_2$ gas was used as a fuel and air was used as an oxidizing agent.

TABLE 2

(Cathode and anode respectively had relative humidity of 80% and humidifying condition)

| | Dispersity of cathode catalyst (Dp) | OCV (open circuit voltage) | output density (mW/cm$^2$) | |
|---|---|---|---|---|
| | | | 0.7 V | Max |
| Example 5 | 0.347 | 985 | 582 | 856 |
| Example 6 | 0.178 | 991 | 612 | 812 |
| Comparative Example 2 | 0.005 | 986 | 324 | 614 |

As shown in Table 2, the fuel cells of Examples 5 and 6 had similar OCV to Comparative Example 2 and excellent output density at 0.7V and Max compared with Comparative Example 1.

While the present invention has been described in connection with certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity. Thus, while this invention has been described in connection with what is presently considered to be some exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A catalyst for a fuel cell, comprising:
a carrier other than heat-treated carbon black or activated carbon; and
an active metal dispersion supported in the carrier,
wherein the active metal has a dispersity ("Dp") represented by the following General Formula 1 and ranging from about 0.01 to about 1.0:

$$Dp = \{X - X_{10}/(X_1 - B)\} \times (B/X)^2$$ [General Formula 1]

wherein X indicates the specific surface area (m$^2$/g) of an active metal calculated using the average particle diameter of the active metal acquired from X-ray diffraction spectrum using a CuKα ray and the density thereof,
wherein $X_{10}$ indicates the specific surface area (m$^2$/g) of an active metal calculated using the particle diameter and density of the active metal when it had a particle diameter of 10 nm,
wherein $X_1$ indicates the specific surface area (m$^2$/g) of an active metal calculated using the particle diameter and density of the active metal when it had a particle diameter of 1 nm, and
wherein B indicates the specific surface area (m$^2$/g) of an active metal calculated from the specific surface area of a catalyst for a fuel cell acquired through a BET (Brunauer, Emmett, Teller) analysis.

2. The catalyst of claim 1, wherein the catalyst comprises a direct oxidation catalyst.

3. The catalyst of claim 2, wherein the catalyst comprises a cathode catalyst.

4. The catalyst of claim 1, wherein the catalyst comprises a polymer electrolyte-type catalyst having a Dp ranging from about 0.1 to about 1.0.

5. The catalyst of claim 4, wherein the catalyst comprises a cathode catalyst.

6. The catalyst of claim 1, wherein the catalyst comprises a polymer electrolyte-type anode catalyst having a Dp ranging from about 0.2 to about 1.0.

7. The catalyst of claim 1, wherein the carrier is selected from the group consisting of a carbon-based material, an inorganic material particulate, and a combination thereof.

8. The catalyst of claim 1, wherein the carrier comprises a specific surface area ranging from about 50 to about 3000 m$^2$/g acquired through a BET analysis.

9. The catalyst of claim 1, wherein the active metal comprises a platinum-based metal.

10. The catalyst of claim 1, wherein the active metal is selected from the group consisting of platinum, ruthenium, osmium, a platinum-ruthenium alloy, a platinum-osmium alloy, a platinum-palladium alloy, and a platinum-M alloy, and a combination thereof, and wherein M is selected from the group consisting of Ga, Ti, V, Cr, Mn, Fe, Co, Ni, Cu, Zn, Sn, Mo, W, Rh, and Ru.

11. The catalyst of claim 1, wherein the active metal comprises an average particle diameter ranging from about 1 to about 10 nm.

12. The catalyst of claim 1, wherein the active metal comprises an amount ranging from about 5 to about 95 wt % based on 100 wt % of the entire catalyst.

13. A membrane-electrode assembly for a fuel cell, comprising:
   a cathode and an anode facing each other; and
   a polymer electrolyte layer disposed between the cathode and the anode,
   wherein the cathode comprises a cathode substrate and a cathode catalyst layer, wherein the anode comprises an anode substrate and an anode catalyst layer, and wherein either the cathode catalyst layer or the anode catalyst layer comprises the catalyst of claim 1.

14. A fuel cell system, comprising:
   an oxidizing agent supplier;
   a fuel supplier; and
   an electrical generator, wherein the electrical generator comprises a membrane-electrode assembly and a separator, wherein the membrane-electrode assembly comprises a cathode and an anode facing each other and a polymer electrolyte layer disposed between the cathode and the anode, wherein the cathode comprises a cathode substrate and a cathode catalyst layer, the anode comprises an anode substrate and an anode catalyst layer, and wherein either the cathode catalyst layer or anode catalyst layer comprises the catalyst of claim 1.

\* \* \* \* \*